United States Patent
Hirsch

(10) Patent No.: US 11,015,873 B2
(45) Date of Patent: May 25, 2021

(54) EXCHANGER ELEMENT FOR PASSENGER COMPARTMENT AND PASSENGER COMPARTMENT EQUIPPED WITH SUCH AN EXCHANGER ELEMENT

(71) Applicant: ZEHNDER GROUP INTERNATIONAL AG, Granichen (CH)

(72) Inventor: Christian Hirsch, Eibenstock (DE)

(73) Assignee: Zehnder Group International AG, Granichen (CH)

( * ) Notice: Subject to any disclaimer, the term of this patent is extended or adjusted under 35 U.S.C. 154(b) by 0 days.

(21) Appl. No.: 15/558,661

(22) PCT Filed: Mar. 17, 2016

(86) PCT No.: PCT/IB2016/051512
§ 371 (c)(1),
(2) Date: Dec. 12, 2017

(87) PCT Pub. No.: WO2016/147147
PCT Pub. Date: Sep. 22, 2016

(65) Prior Publication Data
US 2018/0112927 A1    Apr. 26, 2018

(30) Foreign Application Priority Data

Mar. 17, 2015 (CH) .................................. 00387/15
Apr. 21, 2015 (CH) .................................. 00548/15
Dec. 16, 2015 (CH) .................................. 00101/16

(51) Int. Cl.
*F28D 9/00* (2006.01)
*B60H 1/00* (2006.01)
(Continued)

(52) U.S. Cl.
CPC ....... *F28D 9/0018* (2013.01); *B60H 1/00321* (2013.01); *B60H 1/039* (2019.05);
(Continued)

(58) Field of Classification Search
CPC .. F28D 9/0012; F28D 9/0018; F28D 21/0003; F24F 3/147; F02C 7/08; F28F 2250/108
(Continued)

(56) References Cited

U.S. PATENT DOCUMENTS 2,428,066 A * 9/1947 Ellis ................... B60H 1/00335
165/154
2,650,073 A * 8/1953 Holm ...................... F02C 7/143
165/140
(Continued)

FOREIGN PATENT DOCUMENTS

DE    1455863 U    3/1972
DE    2426946 A1   12/1975
(Continued)

OTHER PUBLICATIONS

ISR of Sep. 13, 2016 for PCT/IB2016/051512.

*Primary Examiner* — Joel M Attey
*Assistant Examiner* — For K Ling
(74) *Attorney, Agent, or Firm* — Maxwell L. Minch; Maxwell L Minch Esq. PA

(57) ABSTRACT

The invention relates to an exchanger arrangement (3) for the heat transfer and/or selective material transfer between a first fluid (F1) and a second fluid (F2), which can flow through the arrangement (3), said arrangement (2) being constituted of a multitude (n) of adjacent local exchanger elements ($E_1, E_2, \ldots, E_n$). The exchanger arrangement (3) has at least in some sections a cylindrical shape or the shape of a segment thereof or a prismatic shape having a polygonal base or the shape of a segment thereof. The adjacent local
(Continued)

exchanger elements ($E_1, E_2, \ldots, E_n$) are flat structures that are either wedge-shaped or sheet-like.

16 Claims, 2 Drawing Sheets

(51) Int. Cl.
    *F28D 21/00*     (2006.01)
    *B60H 1/03*     (2006.01)
    *F24F 3/147*     (2006.01)
    *F28F 13/06*     (2006.01)

(52) U.S. Cl.
    CPC ............ *F24F 3/147* (2013.01); *F28D 9/0012* (2013.01); *F28D 9/0068* (2013.01); *F28D 9/0081* (2013.01); *F28D 21/0014* (2013.01); *F28D 21/0015* (2013.01); *F28F 13/06* (2013.01); *F28F 2250/102* (2013.01); *F28F 2250/108* (2013.01)

(58) Field of Classification Search
    USPC ........................................................ 165/166
    See application file for complete search history.

(56) References Cited

U.S. PATENT DOCUMENTS

| | | | | |
|---|---|---|---|---|
| 3,289,757 A | * | 12/1966 | Rutledge | F25J 3/04412 165/166 |
| 3,741,293 A | * | 6/1973 | Haberski | F02C 7/08 165/166 |
| 4,044,825 A | * | 8/1977 | Gugenberger | F28F 7/02 165/164 |
| 4,438,809 A | * | 3/1984 | Papis | F28D 9/0018 165/166 |
| 4,527,622 A | * | 7/1985 | Weber | F28D 9/0018 165/166 |
| 4,574,872 A | * | 3/1986 | Yano | F24F 3/147 165/10 |
| 4,582,126 A | * | 4/1986 | Corey | F02F 7/0087 165/82 |
| 5,081,834 A | * | 1/1992 | Darragh | F28D 9/04 165/125 |
| 6,374,910 B2 | * | 4/2002 | Tsunoda | F28D 9/0018 165/166 |
| 2009/0314480 A1 | | 12/2009 | Grinbergs et al. | |

FOREIGN PATENT DOCUMENTS

| | | | | |
|---|---|---|---|---|
| DE | 19756346 A1 | 6/1999 | | |
| DE | 102010054965 A1 | 6/2012 | | |
| EP | 0324043 B1 | 9/1991 | | |
| EP | 2444755 A2 | 4/2012 | | |
| EP | 2508814 A1 | 10/2012 | | |
| FR | 1165665 A | 10/1958 | | |
| GB | 2439557 | 1/2008 | | |
| JP | 61031888 A | * | 2/1986 | ........... F28D 9/0068 |
| JP | S6186595 A | 5/1986 | | |
| JP | 2000111279 A | 4/2000 | | |

* cited by examiner

EXCHANGER ELEMENT FOR PASSENGER COMPARTMENT AND PASSENGER COMPARTMENT EQUIPPED WITH SUCH AN EXCHANGER ELEMENT

The invention relates to an exchanger element for a passenger compartment of a motor vehicle, an airplane, a boat, a cable car or an elevator, in particular having an electric drive or having a hybrid drive or having a sail drive as well as relating to a passenger compartment equipped with such an exchanger element.

The use of a heat exchanger for heating passenger compartments is known. The waste heat of an internal combustion engine is typically used to preheat the incoming air introduced into the passenger compartment by means of a heat exchanger. With this use, one must rely on the amount of heat produced in combustion of the fuel in the internal combustion engine.

In addition, the use of an air conditioning system for conditioning the air in vehicle compartments is known. Typical applications include drying and/or cooling of the inlet air introduced into the passenger compartment. With this use, one must rely on energy generated in combustion of fuel in the internal combustion engine for operation of the air conditioning system.

Exchanger configurations and/or exchanger units may be assembled from a plurality of mutually adjacent local exchanger elements.

Such exchanger configurations are known in numerous geometries. Known examples here include configurations having square-shaped outside dimensions or exchanger configurations having prismatic or cylindrical outside dimensions. In most cases, such configurations are installed in larger fluid-carrying and/or fluid-distributing systems.

JP 2013139957 discloses one example of a cylindrical heat exchanger, which can be adapted to various installation situations.

JP 61130791 and JP 61086596 each disclose a rotary heat exchanger containing two cylindrical or disk-shaped heat exchanger parts, which are disposed side by side coaxially along their shared axis and can rotate relative to one another about the shared axis. Each of the two heat exchanger parts is constructed of wedge-shaped elements assembled in the form of a ring. The flow can pass through the two heat exchanger parts along their axial direction and along their radial direction.

DE 2045370 discloses a radial flow heat exchanger, which is designed as a hollow cylinder and through which the flow can pass from its hollow interior through the hollow cylindrical wall to the outside.

EP 0666973 discloses one example of a heat exchanger having adjacent ducts in a countercurrent region. Both the ducts for the fluid flowing through the heat exchanger in one direction and the ducts for the fluid flowing through the heat exchanger in the opposite direction have a cross section approximately in the shape of an isosceles triangle.

EP 0720720 discloses another example of a heat exchanger having adjacent ducts in a countercurrent region. Both the ducts for the fluid flowing through the heat exchanger in one direction and the ducts for the fluid flowing through the heat exchanger in the opposite direction have a cross section approximately in the shape of a trapezoid whose inside angle is in the range of 70° to 90°.

U.S. Pat. No. 8,235,093 discloses an exchanger configuration for the transfer of hot air and atmospheric humidity (water vapor). This exchanger configuration comprises a stack in which membranes and spacers are stacked in alternation one above the other. The membranes are each permeable for heat and water vapor. On the one hand, the spacers create a distance between successive membranes in the stack, and on the other hand, guide the air flow in the interspace between two successive membranes. The spacers are designed as "left-handed" spacers and "right-handed" spacers alternately in the stack and define an inflow region, a flow-through region and an outflow region in a respective interspace according to an "S" for the right-handed spacers and/or form an inflow region, a flow-through region and an outflow region according to a mirror "S" for the left-handed spacer in the respective neighboring interspace. Neighboring interspaces each thus form a local exchanger element in each stack. The inflow region of the respective interspace and outflow region of the respective neighboring interspace are adjacent to one another therein, thus forming a cross-flow region of the local exchanger element. Furthermore, the flow-through region of the respective interspace and the flow-through region of the respective neighboring space are adjacent to one another in the local exchanger element, so that a countercurrent region of the local exchanger element is formed. Finally, in the local exchanger element, the outflow region of the respective interspace and the inflow region of the respective neighboring interspace are adjacent to one another, thereby forming a second countercurrent region of the local exchanger element.

There are installation situations in which the known geometries and flow-through patterns of exchanger configurations mentioned above are unsuitable in a spatially limited installation volume.

The object of the present invention is to permit heating or climate control of a passenger compartment with the lowest possible additional energy consumption or none at all.

To achieve this object, the invention provides, according to a first aspect, an exchanger element for a passenger compartment of a vehicle, an airplane, a boat, a cable car or an elevator, in particular having an electric drive or a hybrid drive or a sail drive, wherein the exchanger element has an exhaust air flow path and an inlet air flow path, and wherein the exhaust air flow path and the inlet air flow path are separated from one another by sections of partition having heat-transmitting wall areas, wherein the exhaust air flow path forms a fluid connection from the interior of the passenger compartment to the outdoor surroundings of the passenger compartment, and wherein the inlet air flow path forms a fluid connection from the outdoor surroundings of the passenger compartment to the interior of the passenger compartment.

The exchanger element according to the invention makes it possible to transfer some of the thermal energy of the exhaust air exiting from the passenger compartment to the incoming air entering the passenger compartment. This makes it possible to maintain a constant warmth of the passenger compartment in the winter even in the absence of an internal combustion engine (strictly electric drive) or the internal combustion engine is not always running (hybrid drive), in which case the heat of approx. 100 W from the driver/pilot is usually sufficient to maintain a comfortable room temperature in the passenger compartment.

The sections of partition preferably include wall areas that transfer water vapor. The exchanger element according to the invention thus also makes it possible for a portion of the atmospheric humidity of the exhaust air going out of the passenger compartment to be transferred to the incoming air entering the passenger compartment. During the winter, this also makes it possible to maintain a sufficiently high and pleasant humidity level in the passenger compartment in addition to maintaining a pleasant room temperature.

In a particularly preferred embodiment, the sections of partition in the exchanger element according to the invention include areas of wall capable of transferring both heat and water vapor. Such areas of wall preferably contain polymer membranes applied to air-permeable backing materials.

The invention also relates to a passenger compartment of a vehicle, an airplane, a boat, a cable car or an elevator, in particular having an electric drive or a hybrid drive or a sail drive, wherein the passenger compartment according to the invention has an exchanger element with an exhaust air flow path and an inlet air flow path, such that the exhaust air flow path and the inlet air flow path are separated from one another by sections of partition having heat transfer areas of wall, wherein the exhaust air flow path forms a fluid connection from the interior of the passenger compartment to the outdoor surroundings of the passenger compartment, and wherein the inlet air flow path forms a fluid connection from the outdoor surroundings of the passenger compartment to the interior of the passenger compartment.

The sections of partition preferably contain water vapor-transferring areas of wall.

The sections of partition especially preferably contain areas of wall capable of transferring both heat and water vapor.

A fan may be connected to the exhaust air flow path and/or the inlet air flow path in order to convey the exhaust air along the exhaust air flow path and/or the inlet air along the inlet air flow path.

The exhaust air flow path is preferably in fluid connection to its outdoor surroundings in a low-pressure outside region of the passenger compartment. The exhaust air can therefore be withdrawn from the passenger compartment even in the absence of a fan.

The inlet air flow path is preferably in fluid connection with its outdoor surroundings located in a high-pressure outside region of the passenger compartment. The inlet air can therefore be forced into the passenger compartment even in the absence of a fan.

The exchanger element expediently contains an electrical heating element which can be supplied with power from a rechargeable battery assigned to the electric drive or the hybrid drive. This electric heating element may be activated as needed in order to heat the exchanger element if the exchanger element should happen to freeze.

The exchanger element according to the invention and/or the passenger compartment according to the invention are of course not limited to "winter operation" (low outdoor temperatures and low atmospheric humidity outdoors) in which the issue is to retain as much heat and optionally water vapor as possible from people in the passenger compartment. The exchanger element according to the invention and/or the passenger compartment according to the invention are instead also suitable for "summer operation" (high outdoor temperatures and high outdoor atmospheric humidity) during which the issue is to keep as much heat as possible and optionally the associated water vapor away from people in the passenger compartment, i.e., to precool and optionally pre-dry the relatively hot and relatively moist inlet air due to the relatively cool and relatively dry exhaust air.

The invention also relates to an exchanger configuration and an exchanger element for heat transport and/or selective mass transfer between a first fluid and a second fluid, in particular for use as an exchanger element for a passenger compartment of a vehicle, an airplane, a boat, a cable car or an elevator, in particular having an electric drive or a hybrid drive or a sail drive, as well as a passenger compartment equipped with such an exchanger element.

According to a second aspect, in particular for use as an exchanger element for a passenger compartment of a vehicle, an airplane, a boat, a cable car or an elevator, in particular having an electric drive or a hybrid drive or a sail drive, an exchanger configuration is made available for heat transport and/or selective mass transport between a first fluid and a second fluid which can flow through the configuration, wherein this configuration is assembled from a plurality (n) of mutually adjacent local exchanger elements ($E_1$, $E_2$, ..., $E_n$), characterized in that the exchanger configuration is in the form of a cylinder or a segment thereof or in the form of a prism having a polygonal base or a segment thereof in at least partial areas.

With such an exterior geometry of the exchanger configuration according to the invention, limited and/or complex installation situations with little dead volume outside of the exchanger configuration can be managed.

The exchanger elements are expediently flat structures adjacent to one another with their large surface areas. In the case of a heat exchanger, such flat structures made of thin plates made of metal, polymer or a metal/polymer composite material, for example, can be provided with a three-dimensional structure by simple forming methods or by injection molding, typically in one step. It is especially advantageous if all of the exchanger elements are identical structures. This makes it possible to save on mold costs and logistics costs.

The configuration expediently has a countercurrent region which is suitable due to a particularly pronounced heat exchange and/or mass exchange between the two fluids flowing in opposition to one another.

The configuration expediently also includes a crosscurrent region. The configuration preferably has such a cross-flow region in an area in which the first fluid flows in and the second fluid flows out. The configuration preferably includes one such cross-flow region in an area in which the second fluid flows in and the first fluid flows out.

In a particularly advantageous embodiment, the configuration in the countercurrent region is in the region of a cylinder or a segment thereof or a prism with a polygonal base or a segment thereof. The local exchanger elements ($E_1$, $E_2$, ..., $E_n$) of the configuration each include a first compartment region through which the first fluid can flow from the first fluid inlet region to the first fluid outlet region, and a second compartment region through which the second fluid can flow from a second fluid inlet region to a second fluid outlet region, wherein the first compartment region and the second compartment region are adjacent to one another in an adjacent region and are separated from one another by means of a membrane-type wall which permits heat transport and/or selective mass transport between the first fluid flowing into the first compartment region and the second fluid flowing in the second compartment region.

The term "exchanger element" stands for a basic geometric unit of the exchanger configuration according to the invention, which is functional in principle by itself but functions optimally with neighboring exchanger elements.

In particular the exchanger configuration includes a first global fluid inlet region and a first global fluid outlet region as well as a second global fluid inlet region and a second global fluid outlet region wherein the first fluid can flow through the configuration from the first global fluid inlet region to the first global fluid outlet region and the second fluid can flow through the configuration from the second global fluid inlet region to the second global fluid outlet region. A local element ($E_i$) contains a first local chamber region ($K_1$), through which the first fluid can flow from a first local fluid inlet region to a first local fluid outlet region, and contains a second local chamber region ($K_2$) through which the second fluid can flow from a second local fluid inlet region to a second local fluid outlet region.

In particular it is true here that:

1) The first local chamber region ($K_1$) and the second local chamber region ($K_2$) of a local element ($E_i$) are adjacent to one another in an adjoining region ($M_i$; $P_i$) inside the respective element ($E_i$).

2) The first local chamber region ($K_1$) of the local element ($E_i$) and the second local chamber region ($K_2$) of a first local neighboring element ($E_{i-1}$) are adjacent to one another in an adjacent region ($M_{i-1}$; $P_{i-1}$) between the local element ($E_i$) and the first local neighboring element ($E_{i-1}$).

3) The second local chamber region ($K_2$) of the element ($E_i$) and the first local chamber region ($K_1$) of a second local neighboring element ($E_{i+1}$) are adjacent to one another in an adjoining region ($M_{i+1}$; $P_{i+1}$) between the element ($E_i$) and the second neighboring element ($E_{i+1}$).

4) Local chamber regions adjacent to one another within an element and from one element to another in the respective adjoining region are separated from one another by means of a membrane-type wall, which permits heat transport and/or selective mass transport between the first fluid flowing in the first local chamber region ($K_1$) and the second fluid flowing in the second local chamber region ($K_2$).

5) The totality of the first local fluid inlet regions of the exchanger elements forms the first global fluid inlet region of the exchanger configuration.

6) The totality of the second local fluid inlet regions of the exchanger elements forms the second global fluid inlet region of the exchanger configuration.

7) The totality of the first local fluid outlet regions of the exchanger elements forms the first global fluid outlet region of the exchanger configuration.

8) The totality of the second local fluid outlet regions of the exchanger elements forms the second global fluid outlet region of the exchanger configuration.

In a first particularly preferred variant of the exchanger configuration, the local exchanger elements ($E_1$, $E_2$, ..., $E_n$) are designed in a wedge shape in at least partial regions of the configuration in which the configuration is in the form of a cylinder or a segment thereof or the form of a prism with a polygonal base or a segment thereof. They are each delineated spatially from a first wedge face and a second wedge face at a distance from the former and inclined in relation to it, a first side face and a second side face a distance apart therefrom as well as a first end face and a second end face spaced a distance apart therefrom which is larger than the first end face. This permits assembly of the exchanger configurations according to the invention using only one type of exchanger element.

In a second particularly preferred variant of the exchanger configuration, the local exchanger elements ($E_1$, $E_2$, ..., $E_n$) are designed in a plate shape at least in partial areas of the configuration in which the configuration is in the form of a cylinder or a segment thereof or the form of a prism with a polygonal base or a segment thereof. They are each spatially delineated from a first large area and a second large area at a distance therefrom, a first side face and a second side face of a distance therefrom as well as a first end face and a second end face at a distance therefrom. This also makes it possible to assemble the exchanger configurations according to the invention using only one type of exchanger elements.

Preferably at least one region of the configuration is designed as a countercurrent region in which at least mutually adjacent ducts run parallel to one another. The term "countercurrent region" should be understood, on the one hand, to refer to geometries having a global parallelism, i.e., adjacent parallel ducts within the overall countercurrent region. On the other hand, this should be understood to include geometries having a local parallelism, i.e., mutually approximately parallel neighboring ducts but not all ducts run parallel to one another within the overall countercurrent region and wherein in particular the deviation from parallelism between two ducts of the countercurrent region, i.e., the angle between the direction of two ducts is greater, the greater the distance between the two ducts inside the countercurrent region.

The ducts of the countercurrent region of the exchanger configuration according to the invention may have polygonal cross-sectional faces. The ducts of the countercurrent region preferably have cross-sectional faces in the form of a regular quadrilateral, in particular in the form of a trapezoid of a rhombus or a rectangle. Alternatively, the ducts of the countercurrent region may also have cross-sectional faces in the form of a regular triangle, in particular in the form of an equilateral triangle or an isosceles triangle.

Alternatively, the ducts of the countercurrent region may also have cross-sectional faces in the form of the regular hexagon or a regular octagon.

To achieve the object defined in the introduction, the invention also proposes an exchanger element for an exchanger configuration according to the invention which is characterized in that the mutually adjacent local exchanger elements ($E_1$, $E_2$, ..., $E_n$) are flat structures.

Such flat structures can be manufactured easily from metal, polymer or metal/polymer composite materials, for example. The thickness of a local flat exchanger element is preferably less than ⅕ of the smallest transverse dimension of the flat exchanger element.

In a first variant the exchanger element is designed in a wedge shape and is delineated spatially by a first wedge face and an inclined second wedge face at a distance from the former, a first side face and a second side face at a distance from the former as well as a first end face and a second end face at a distance from the former, larger than the first end face. Exchanger configurations according to the invention can be assembled using only one type of exchanger element by using such wedge-shaped exchanger elements.

A first fluid inlet region and a second fluid outlet region may be arranged on the first end face and a second fluid inlet region and a first fluid outlet region may be arranged on the second end face. This is suitable for radial flow through cylindrical or partially cylindrical as well as prismatic or partially prismatic exchanger configurations.

The first fluid inlet region and the second fluid outlet region are preferably designed as a first crosscurrent region and the second fluid inlet region and the first fluid outlet region are preferably designed as a second crosscurrent region.

In a second variant the element is designed in the form of a plate and is spatially delineated by a first large face and a second large face at a distance therefrom, running parallel to the first large face, a first side face and a second side face at a distance therefrom as well as a first end face and a second end face at a distance therefrom. This is suitable for radial flow through cylindrical or partially cylindrical as well as prismatic or partially prismatic exchanger configurations. In particular this second variant is suitable for exchanger configurations in the form of a hollow cylinder or a hollow prism.

A first fluid inlet region and a second fluid outlet region may be arranged on the first end face and a second fluid inlet region and a first fluid outlet region may be arranged on the second end face.

The first fluid inlet region and the second fluid outlet region are preferably designed as a first crosscurrent region and the second fluid inlet region and the first fluid outlet region are preferably designed as a second crosscurrent region.

According to a third aspect, in particular for use as an exchanger element for a passenger compartment of a vehicle, an airplane, a boat, a cable car or an elevator, in particular with an electric drive or a hybrid drive or a sail drive, an exchanger configuration is provided for heat transport and/or selective mass transport between a first fluid and a second fluid which can flow through the configuration, wherein the configuration is constructed of a plurality (n) of adjacent local exchanger elements ($E_1, E_2, \ldots, E_n$) which is characterized in that the exchanger configuration is in the form of a segment of a cylinder or in the form of a segment of a prism in at least a subarea.

With such an exterior geometry of the exchanger configuration according to the invention, limited and/or complicated installation situations with little dead volume outside of the exchanger configuration can be managed.

The cylinder segment or the prism segment is preferably delineated spatially by at least one sectional plane which runs parallel to the longitudinal axis of a cylinder and/or a prism. Such a cylinder segment or prism segment may have one or more side faces in addition to its end face.

Alternatively or additionally, the cylinder segment or the prism segment may be delineated spatially by at least one lateral surface of the cylinder, the generating line of which runs parallel to the longitudinal axis of the cylinder and/or prism. Such a cylinder segment or prism segment may have one or more curved side faces in addition to its end faces.

Alternatively or additionally, the cylinder segment or the prism segment is delineated spatially by at least one lateral surface of the polygon, whose lateral planes run parallel to the longitudinal axis of a cylinder and/or a prism. Such a cylinder segment or prism segment may have one or more side faces that are flat in some sections.

To achieve the object defined in the introduction, the invention also provides an exchanger element for an exchanger configuration according to the invention which is characterized in that the mutually adjacent local exchanger elements ($E_1, E_2, \ldots, E_n$) are flat structures.

Such flat structures can be manufactured easily from metal, polymer or metal/polymer composite materials, for example. The thickness of a local flat exchanger element is preferably less than ⅕ of the smallest transverse dimension of the flat exchanger element.

In a third variant the element is a wedge-shape volume element and/or is designed in the form of a wedge and is spatially delineated by a first wedge face and a second wedge face spaced a distance away from the former and inclined relative to it, a first side face and a second side face spaced a distance apart therefrom as well as a first end face and a second end face spaced a distance therefrom, the second end face being larger than the first end face.

A first fluid inlet region and a second fluid outlet region may be arranged on the first side face of the element and a second fluid inlet region as well as a first fluid outlet region may be arranged on the second side face. This is suitable for radial flow through partially cylindrical and/or partially prismatic exchanger configurations.

Alternatively, a first fluid inlet region and a second fluid outlet region may be arranged on the first end face and a second fluid inlet region and a first fluid outlet region may be arranged on the second end face. This is suitable for radial flow through partially cylindrical and/or partially prismatic exchanger configurations.

The first fluid inlet region and the second fluid outlet region are preferably designed as a first cross-flow region, and the second fluid inlet region and the first fluid outlet region are preferably designed as a second cross-flow region.

In a fourth variant the element is designed as a plate-shaped volume element, i.e., is designed in the form of plates and is spatially delineated from a first large face and a second large face at a distance therefrom running parallel to the first large face, a first side face and a second side face at a distance therefrom as well as a first end face and a second end face at a distance therefrom. This is suitable for radial flow through partially cylindrical and/or partially prismatic exchanger configurations. In particular this fourth variant is suitable for exchanger configurations in the form of a hollow cylinder segment or a hollow prism segment.

A first fluid inlet region and a second fluid outlet region may be arranged on the first end face and a second fluid inlet region and a first fluid outlet region may be arranged on the second end face. This is suitable for radial flow through partially cylindrical and/or partially prismatic exchanger configurations.

Alternatively, a first fluid inlet region and a second fluid outlet region may be arranged on the first side face and a second fluid inlet region and a first fluid outlet region may be arranged on the second side face. This is suitable for axial flow through partially cylindrical and/or partially prismatic exchanger configurations.

The first fluid inlet region and the second fluid outlet region are preferably designed as a first crosscurrent region, and the second fluid inlet region and the first fluid outlet region are preferably designed as a second cross-flow region.

At least one region of the element is preferably designed as a countercurrent region in which at least mutually adjacent ducts run parallel to one another. The term "countercurrent region" should be understood, on the one hand, to refer to geometries having a global parallelism, i.e., parallel ducts inside the entire countercurrent region. On the other hand, this should also be understood to include geometries having a local parallelism, i.e., approximately parallel adjacent ducts but not all ducts running parallel to one another within the total countercurrent region and in particular the deviation from parallelism between two ducts of the countercurrent region, i.e., the angle between the direction of two ducts being larger, the farther apart from one another the two ducts are within the countercurrent region.

The ducts of the countercurrent region of the exchanger element according to the invention may have polygonal cross-sectional areas. The ducts of the countercurrent region have cross-sectional faces in the form of a regular quadrilateral, in particular in the form of a trapezoid, a rhombus or a rectangle. Alternatively, the ducts of the countercurrent region may also have cross-sectional faces in the form of a regular triangle, in particular in the form of an equilateral triangle or an isosceles triangle. Alternatively, the ducts of the countercurrent region may also have cross-sectional faces in the form of a regular hexagon or a regular octagon.

Additional advantages, features and possible applications of the invention are derived on the basis of the accompanying drawings which are not to be interpreted as being restrictive and in which.

Figure 1:
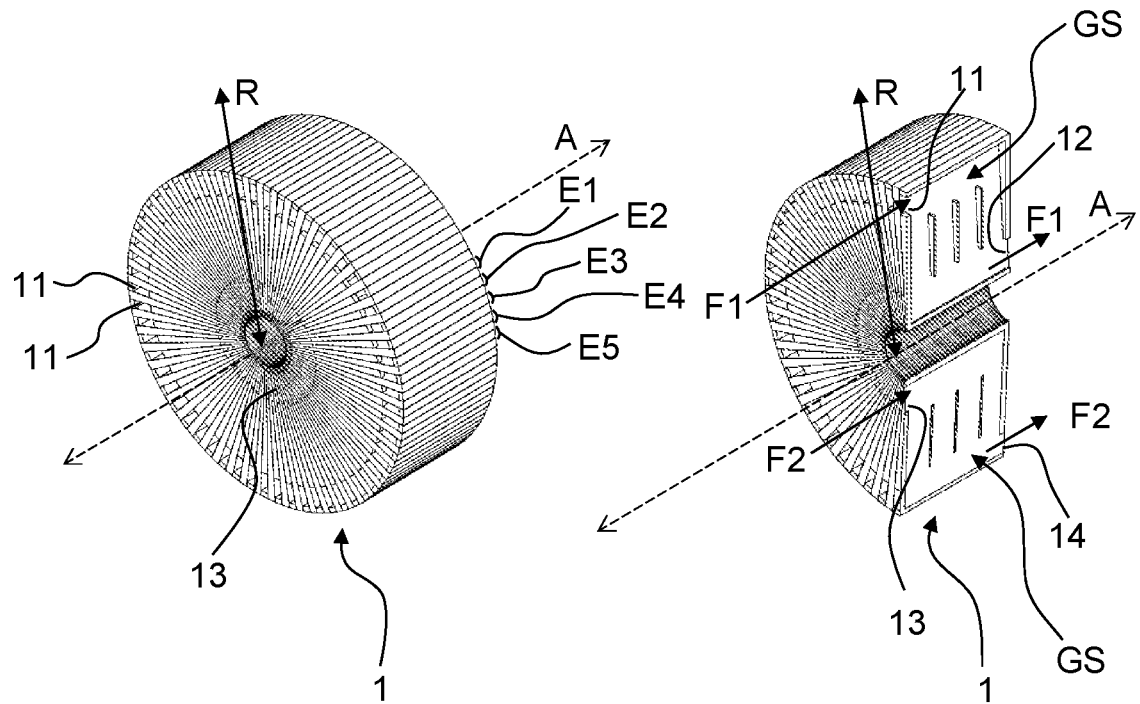
FIG. 1 shows a first embodiment of an exchanger configuration according to the invention in a perspective view and in a partially cutaway condition.

FIG. 1 shows a first exemplary embodiment of the exchanger configuration 1 according to the invention in a perspective view as well as in a partially cutaway condition. This shows an exchanger configuration 1 having a hollow cylindrical geometry and rotational symmetry with respect to a hollow cylinder axis which defines an axial direction indicated as double arrow A. Accordingly, a radial direction is indicated as a double arrow R. The exchanger configuration 1 has on its first end side inlet openings 11 for the first fluid F1 along a radially outside region distributed uniformly along this circumferential direction and on its second side outlet openings for the first fluid F1 along a radially interior region distributed uniformly along the circumferential direction. Furthermore, the exchanger configuration 1 has inlet openings 13 for the second fluid F2 on its first end side along a radially inner region distributed uniformly along the peripheral direction and has outlet openings 14 for the second fluid F2 on its second end side along a radially outer region along the peripheral direction distributed uniformly along the peripheral direction.

Figure 2:
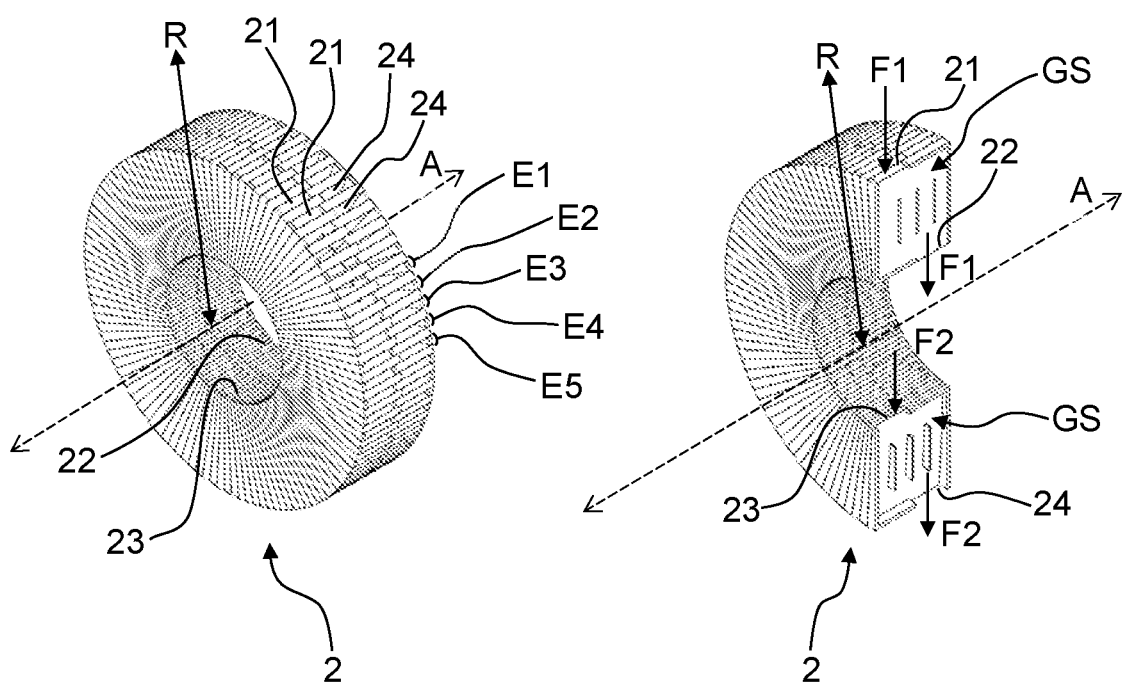
FIG. 2 shows a second exemplary embodiment of an exchanger configuration according to the invention in a perspective view and in a partially cutaway condition.

FIG. 2 shows a second exemplary embodiment of the exchanger configuration 2 according to the invention in a perspective view as well as in a partially cutaway condition. This again shows an exchanger configuration 2 having a hollow cylinder geometry and rotational symmetry with respect to a hollow cylinder axis which defines an axial direction indicated as a double arrow A. Accordingly a radial direction is indicated as a double arrow R. The exchanger configuration 2 has inlet openings 21 for the first fluid F1 on its outer lateral surface in an axial region close to the first end face distributed uniformly along the peripheral direction and has outlet openings 22 for the first fluid F1 distributed uniformly along the peripheral direction on its inner lateral surface in an axial region close to the second end face. Furthermore, the exchanger configuration 2 has inlet openings 23 for the second fluid F2 distributed uniformly along the peripheral direction on its inner lateral surface in an axial region close to the first end face and also has outlet openings 24 for the second fluid F2 distributed uniformly along the peripheral direction on its outer lateral surface in an axial region close to the second end face.

FIG. 1 and FIG. 2 show a countercurrent region GS in the exchanger configuration 1 and/or in the exchanger configuration 2 having a hollow cylinder geometry. In this countercurrent region GS the main flow runs in the radial direction. The term "main flow" is understood to refer to the portion of the flow which flows through the exchanger configuration and in which most preferably more than 60%, even more preferably more than 80% of the energy exchange taking place in the exchanger configuration occurs between the first fluid F1 and second fluid F2.

In FIG. 1 the oncoming flow of fluid F1 and fluid F2 takes place from the outside radially through openings 11 and/or from the inside radially through openings 13, in each case on the first end face of the hollow cylindrical exchanger configuration 1 while the continuous flow in the countercurrent region GS takes place in the radical direction in the interior of the hollow cylindrical exchanger configuration 1 and the outgoing flow of fluid F1 and fluid F2 takes place from the inside radially through openings 12 and/or on the outside radially through openings 14 in each case on the second end face of the hollow cylindrical exchanger configuration 1.

In FIG. 2 the oncoming flow of fluid F1 and fluid F2 takes place through openings 21 on the outer lateral surface and/or through openings 23 on the inner lateral surface in each case axially close to the first end side of the hollow cylindrical exchanger configuration 2 while the continuous flow in the countercurrent region GS takes place in the radial direction in the interior of the hollow cylindrical exchanger configuration 2 and the outgoing flow of fluid F1 and fluid F2 through openings 22 takes place on the inner lateral surface and/or through openings 24 on the outer lateral surface in each case close to the second end side of the hollow cylindrical exchanger configuration 2.

Figure 3:
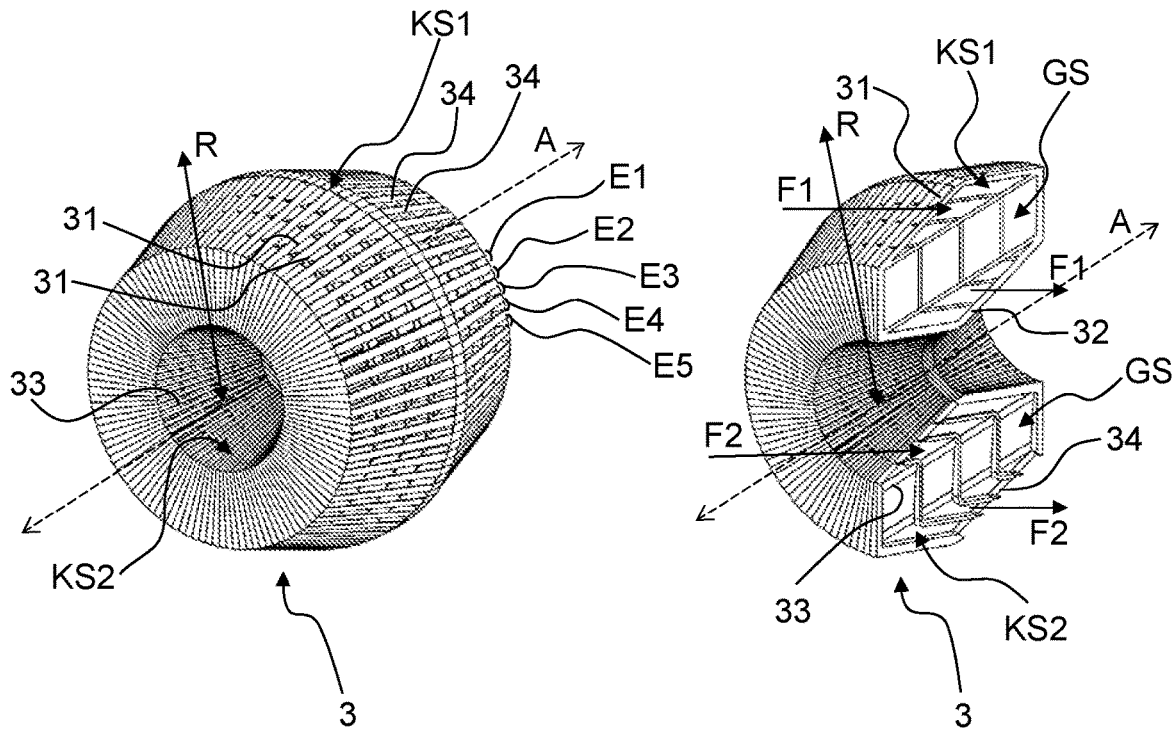
FIG. 3 shows a third exemplary embodiment of an exchanger configuration according to the invention in a perspective view and in a partially cutaway condition.

FIG. 3 shows a third exemplary embodiment of the exchanger configuration 3 according to the invention in a perspective view as well as in a partially cutaway condition. It can be seen that this is an exchanger configuration 3 having rotational symmetry with respect to an axis which defines an axial direction, indicated as double arrow A. Accordingly a radial direction is indicated as double arrow R. The exchanger configuration 3 includes a countercurrent region GS having the shape of a hollow cylinder as well as a first crosscurrent region KS1 connected to the outer lateral surface of the countercurrent hollow cylinder and a second crosscurrent region KS2 connected to the inner lateral surface of the countercurrent hollow cylinder. In the countercurrent region GS the first fluid F1 flows radially from the outside to the inside and the second fluid F2 flows radially from the inside to the outside. In both crosscurrent regions KS1 and KS2 the first fluid F1 and the second fluid F2 flow transversely. The angle of intersection between the first fluid F1 and the second fluid F2 is preferably in the range of 160° and 90° based on 180° for countercurrent (antiparallel), 90° for strict cross current without a countercurrent or cocurrent component and 0° for cocurrent (parallel). The exchanger configuration 3 has inlet openings 31 distributed uniformly along the peripheral direction along a region on the outside radially for the first fluid and its first crosscurrent region KS1 on the outside radially on its side facing the first end side and outlet openings 32 for the first fluid F1 distributed uniformly along a region on the inside radially along the peripheral direction on its second crosscurrent region KS2 on the inside radially on its side facing the second end side. Furthermore, the exchanger configuration 3 has inlet openings 33 for the second fluid F2 distributed uniformly along a region on the inside radially along the peripheral direction on its second crosscurrent region KS2 on the inside radially on its side facing the first end side and has outlet openings 34 for the second fluid F2 distributed uniformly along a region on the outside radially along the peripheral direction on its first crosscurrent region KS1 on the outside radially on its side facing the second end side.

FIG. 3 shows crosscurrent regions KS1 and/or KS2 applied to the outer and inner lateral sides of the hollow cylinder. The crosscurrent region KS1 forms a fluid inlet region for the first fluid F1 and fluid outlet region for the second fluid F2. The crosscurrent region KS2 forms a fluid inlet region for the second fluid F2 and a fluid outlet region for the first fluid F1. Along the direction of flow of the two fluids flowing through the exchanger configuration, a radial countercurrent region in which the first fluid F1 and the second fluid F2 flow in opposite directions from one another extends between the crosscurrent region KS1 on the outside radially and the crosscurrent region KS2 on the inside radially.

Figure 4:
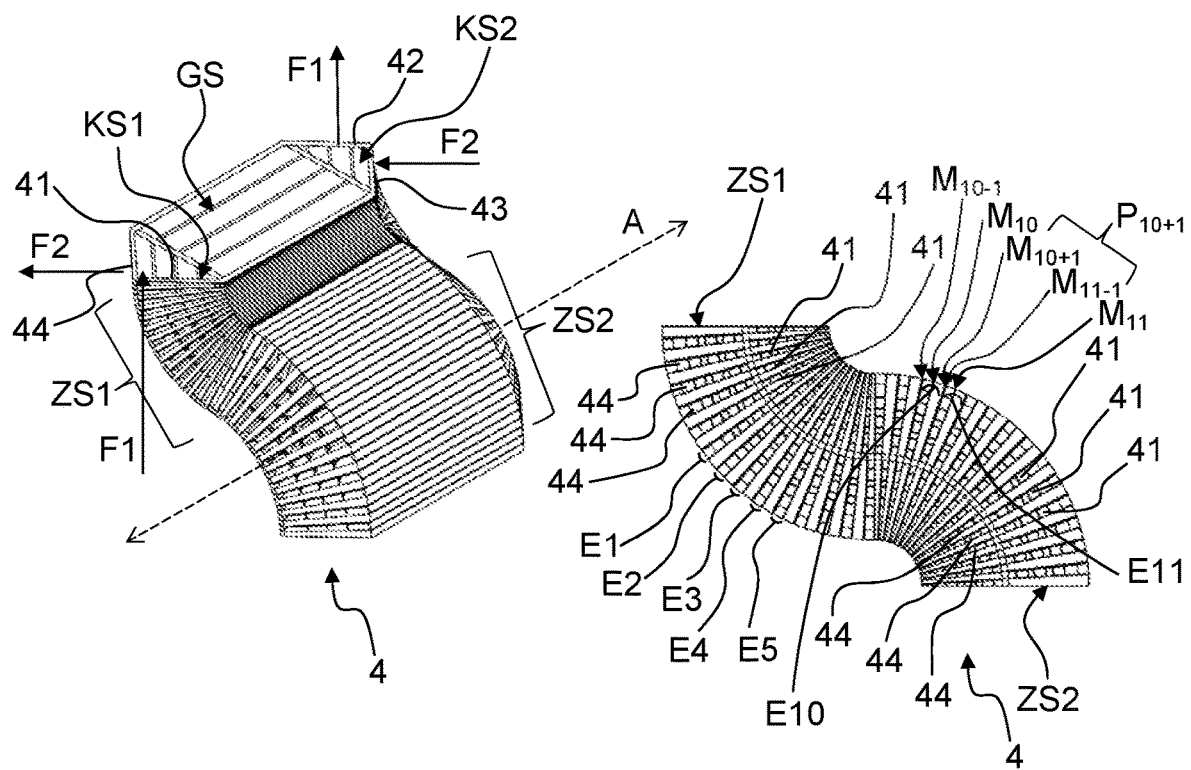
FIG. 4 shows a fourth exemplary embodiment of an exchanger configuration according to the invention in a perspective view and in a view from above of an end face of the exchanger configuration.

FIG. 4 shows a fourth exemplary embodiment of an exchanger configuration 4 according to the invention in a perspective view as well as in a view from above of an end face of the exchanger configuration 4. This shows an exchanger configuration 4 comprising individual cylinder segments ZS1, ZS2. The two cylinder segments ZS1 and ZS2 each represent a 90° section of the higher cylinder as measured in the circumferential direction. This shows crosscurrent regions KS1 and KS2, which are disposed on the front and rear end sides, respectively, of the cylinder segments ZS1 and ZS2. The crosscurrent region KS1 forms a fluid inlet region for the first fluid F1 and a fluid outlet region for the second fluid F2. The crosscurrent region KS2 forms a fluid inlet region for the second fluid 2 and a fluid outlet region for the first fluid F1. Between the first crosscurrent region KS1 and the second crosscurrent region KS2, an axial countercurrent region, in which the first fluid F1 and the second fluid F2 flow in opposite directions from one another and parallel to the axial direction A of the cylinder segments ZS1, ZS2, extends along the direction of flow of the two fluids flowing through the exchanger configuration. Cylinder segments with a different angular section along the peripheral direction may also be used. In particular, 45° cylinder segments (not shown) may also be used instead of or in combination with the 90° cylinder segments ZS1 and ZS2 to form an exchanger configuration 4 comprised of individual cylinder segments.

FIG. 1, FIG. 2, FIG. 3 and FIG. 4 each show local exchanger elements $E_1, E_2, E_3, E_4, E_5, \ldots, E_n$, of which the respective exchanger configurations 1, 2, 3, 4 are comprised. A local exchanger element $E_1, E_2, E_3, E_4, E_5, \ldots, E_n$ includes in each case a first local chamber region $K_1$ through which the first fluid F1 can flow from a first local fluid inlet region to a first local fluid outlet region and a second local chamber region $K_2$ through which the second fluid F2 can flow from a second local fluid inlet region to a second local fluid outlet region.

The invention claimed is:

1. An exchanger configuration (1; 2; 3), wherein the configuration is constructed from a plurality (n) of mutually adjacent local exchanger elements (E1, E2, . . . , En), characterized in that the exchanger configuration is in the form of a cylinder or a segment thereof or in the form of a prism having a polygonal base or a segment thereof in at least partial regions; and said local exchanger elements (E1, E2, . . . , En) is designed in the form of a wedge in at least partial regions of the configuration in which the configuration is in the form of a cylinder or of a segment thereof or the form of a prism with a polygonal base or a segment thereof, and is spatially delineated by a first wedge face and a second wedge face at a distance from the first wedge face and inclined relative thereto, a first side face and a second side face at a distance therefrom as well as a first end face and a second end face at a distance therefrom, said second end face larger than the first end face;

wherein a fluid inlet region for a first fluid (F1) is disposed on a radially outside region and a fluid inlet region for a second fluid (F2) is disposed on a radially interior region, and a fluid outlet region for the second fluid (F2) is disposed on a radially outside region and a fluid outlet region for the first fluid (F1) is disposed on a radially interior region;

wherein the first fluid (F1) along said radially outside region is distributed uniformly along a circumferential direction and on its fluid outlet openings for the first fluid (F1) along said radially interior region distributed uniformly along the circumferential direction; and wherein the second fluid (F2) along said radially inner region is distributed uniformly along a peripheral direction and on its fluid outlet openings for the second fluid (F2) along said radially outside region along the peripheral direction distributed uniformly along the peripheral direction; and wherein a second fluid (F2) has a countercurrent region having a radial flow pattern from the inner crossflow region close to the center towards the outer crossflow region close to the circumference, and/or wherein a first fluid (F1) has a countercurrent region having a radial flow pattern from outer crossflow region close to the circumference towards the inner crossflow region close to the center, whereby an essentially S-shaped flow pattern of the first fluid (F1) and/or the second fluid (F2) is formed from the inlet region to the outlet region.

2. The exchanger configuration according to claim 1, characterized in that the exchanger elements are flat structures which have their second end faces adjacent to one another, wherein all exchanger elements are identical structures.

3. The exchanger configuration according to claim 1, characterized in that the configuration has a crosscurrent region.

4. The exchanger configuration according to claim 3, characterized in that the configuration has a crosscurrent in a region in which the first fluid flows in and the second fluid flows out.

5. The exchanger configuration according to claim 3, characterized in that the configuration is in the form of a cylinder or a segment thereof in the crosscurrent region or in the form of a prism having a polygonal base or a segment thereof.

6. The exchanger configuration according to claim 5, characterized in that the countercurrent region has the first fluid flowing through said configuration in a first radial direction and the second fluid flowing through said configuration in a second radial direction.

7. The exchanger configuration according to claim 1, characterized in that the configuration has a first global fluid inlet region (GFE1) and a first global fluid outlet region (GFA1) as well as a second global fluid inlet region (GFE2) and a second global fluid outlet region (GFA2);

wherein the configuration has the first fluid flowing through said configuration from the first global fluid inlet region to the first global fluid outlet region as well as having the second fluid flowing through said configuration from the second global fluid inlet region to the second global fluid outlet region;

wherein a local element (Ei) has a first local chamber region (K1) which has the first fluid flowing through said configuration from a first local fluid inlet region (LFE1) to a first local fluid outlet region (LFA1) and has a second local chamber region (K2), which has the second fluid flowing through said configuration from a second local fluid inlet region (LFE2) to a second local fluid outlet region (LFA2);

wherein the first local chamber region (K1) and the second local chamber region (K2) of said local element (Ei) are adjacent to one another in an adjacent region (Mi; Pi) inside the respective element (Ei);

wherein the first local chamber region (K1) of the local element (Ei) and the second local chamber region (K2) of a first local neighboring element (Ei−1) are adjacent to one another in an adjacent region (Mi−1; Pi−1) between said local element (Ei) and said first local neighboring element (Ei−1);

wherein the second local chamber region (K2) of said local element (Ei) and the first local chamber region (K1) of a second local neighboring element (Ei+1) are adjacent to one another in an adjacent region (Mi+1; Pi+1) between said local element (Ei) and the said second neighboring element (Ei+1);

wherein mutually adjacent local chamber regions (K1, K2) within said first local neighboring element (Ei−1), local element (Ei) and the said second neighboring element (Ei+1) and are separated from one another, from one element to the next in the respective adjacent region, by means of a membrane-type wall (Mi−1; Mi; Mi+1), each permitting heat transport and/or selective mass transport between the first fluid flowing in the first local chamber region (K1) and the second fluid flowing in the second local chamber region (K2); and wherein the totality of the first local fluid inlet regions (LFE1) of the exchanger elements forms the first global fluid inlet region (GFE1) of the exchanger configuration, the totality of the second local fluid inlet regions (LFE2) of the exchanger elements forms the second global fluid inlet region (GFE2) of the exchanger configuration, the totality of the first local fluid outlet regions (LFA1) of the exchanger elements forms the first global fluid outlet region (GFA1) of the exchanger configuration and the totality of the second local fluid outlet regions (LFA2) of the exchanger elements forms the second global fluid outlet region (GFA2) of the exchanger configuration.

8. The exchanger element for an exchanger configuration according to claim 1, characterized in that the adjacent local exchanger elements (E1, E2, En) are flat structures.

9. The exchanger element according to claim 1, characterized in that the first fluid inlet region and the second fluid outlet region are designed as a first crosscurrent region (KS1), and the second fluid inlet region and the first fluid outlet region are designed as a second crosscurrent region (KS2).

10. An exchanger configuration (4), wherein the configuration is constructed from a plurality (n) of adjacent local exchanger elements (E1, E2, . . . , En), characterized in that the exchanger configuration is in the form of a cylinder segment in a partial region or is in the form of a prism segment;

wherein the adjacent local exchanger elements (E1, E2, . . . , En) are flat structures comprising of a wedge-shaped volume element and is spatially delineated and has a distance from a first wedge face and a second wedge face at a distance therefrom and inclined at an angle thereto, a first side face and a second side face at a distance therefrom as well as a first end face and a second end face at a distance therefrom said second end face larger than the first end face;

wherein a first fluid inlet region and a second fluid inlet region are disposed on the first side face, and a second fluid outlet region and a first fluid outlet region are disposed on the second end face; and wherein a second fluid (F2) has a countercurrent region having a radial flow pattern from the inner crossflow region close to the center towards the outer crossflow region close to the circumference, and/or wherein a first fluid (F1) has a countercurrent region having a radial flow pattern from outer crossflow region close to the circumference towards the inner crossflow region close to the center, whereby an essentially S-shaped flow pattern of the first fluid (F1) and/or the second fluid (F2) is formed from the inlet region to the outlet region.

11. The exchanger configuration according to claim 10, characterized in that the cylinder segment or the prism segment is spatially delineated by at least one sectional plane running parallel to a longitudinal axis of the cylinder and/or a prism.

12. The exchanger configuration according to claim 10, characterized in that the cylinder segment or the prism segment is spatially delineated by at least one cylinder lateral surface whose generating line runs parallel to a longitudinal axis of a cylinder and/or of a prism.

13. The exchanger configuration according to claim 10, characterized in that the cylinder segment or the prism segment is spatially delineated by at least one polygonal lateral surface whose lateral planes run parallel to a longitudinal axis of a cylinder and/or of a prism.

14. The exchanger element according to claim 13, characterized in that the thickness of a local flat exchanger element is less than ⅕ of a smallest transverse dimension of the flat exchanger element.

15. The exchanger element according to claim 10, characterized in that the first fluid inlet region and the second fluid outlet region are designed as a first crosscurrent region, and the second fluid inlet region and the first fluid outlet region are designed as a second crosscurrent region.

16. An exchanger configuration (1; 2; 3), wherein the configuration is constructed from a plurality (n) of mutually adjacent local exchanger elements (E1, E2, . . . , En), characterized in that the exchanger configuration is in the form of a cylinder or a segment thereof or in the form of a prism having a polygonal base or a segment thereof in at least partial regions; and said local exchanger elements (E1, E2, . . . , En) is designed in the form of a wedge in at least partial regions of the configuration in which the configuration is in the form of a cylinder or of a segment thereof or the form of a prism with a polygonal base or a segment thereof, and is spatially delineated by a first wedge face and a second wedge face at a distance from the first wedge face and inclined relative thereto, a first side face and a second side face at a distance therefrom as well as a first end face and a second end face at a distance therefrom, said second end face larger than the first end face;

wherein a fluid inlet region for a first fluid (F1) is disposed on a radially outside region and a fluid inlet region for a second fluid (F2) are is disposed on a radially interior region, and a fluid outlet region for the second fluid (F2) is disposed on a radially outside region and a fluid outlet region for the first fluid (F1) is disposed on a radially interior region; and wherein the first fluid inlet region and the second fluid outlet region are designed as a first crosscurrent region (KS1), and the second fluid inlet region and the first fluid outlet region are designed as a second crosscurrent region (KS2); and wherein a second fluid (F2) has a countercurrent region having a radial flow pattern from the inner crossflow region close to the center towards the outer crossflow region close to the circumference, and/or wherein a first fluid (F1) has a countercurrent region having a radial flow pattern from outer crossflow region close to the circumference towards the inner crossflow region close to the center, whereby an essentially S-shaped flow pattern of the first fluid (F1) and/or the second fluid (F2) is formed from the inlet region to the outlet region.

* * * * *